U
nited States Patent [19]

Elias

[11] Patent Number: 4,693,752
[45] Date of Patent: Sep. 15, 1987

[54] COATING GRADE ASPHALT

[75] Inventor: Samir F. Elias, Granville, Ohio

[73] Assignee: Owens-Corning Fiberglas Corporation, Toledo, Ohio

[21] Appl. No.: 853,258

[22] Filed: Apr. 17, 1986

[51] Int. Cl.$^4$ .............................................. C08L 95/00
[52] U.S. Cl. ................................ 106/280; 106/281 R; 208/23; 208/44
[58] Field of Search ............ 106/280, 281 R; 208/23, 208/44; 106/273 R

[56] References Cited

U.S. PATENT DOCUMENTS

| | | | |
|---|---|---|---|
| 2,461,971 | 2/1949 | Fischer | 106/269 |
| 2,465,960 | 3/1949 | van den Berge | 196/22 |
| 2,485,321 | 10/1949 | Schiermeter | 106/14 |
| 2,764,523 | 9/1956 | Cottle et al. | 196/22 |
| 2,877,129 | 3/1959 | Hardman | 106/279 |
| 3,051,766 | 8/1962 | Hunter et al. | 260/668 |
| 3,061,538 | 10/1962 | Corbett | 208/44 |
| 3,087,887 | 4/1963 | Corbett et al. | 208/45 |
| 3,093,573 | 6/1963 | Corbett | 208/39 |
| 3,547,850 | 12/1970 | Montgomery et al. | 260/28.5 |
| 3,763,270 | 10/1973 | Schmerling | 260/683.47 |
| 3,773,843 | 11/1978 | Schmerling | 260/666 P |
| 3,919,072 | 11/1975 | Pitchford et al. | 208/4 |
| 4,032,355 | 6/1977 | McLaughlin | 106/273 N |
| 4,176,044 | 11/1979 | White | 208/46 |
| 4,279,736 | 7/1982 | Gleim | 208/215 |
| 4,317,712 | 3/1982 | Farcasiu | 208/46 |
| 4,452,690 | 6/1984 | Shih | 208/46 |
| 4,455,218 | 6/1984 | Dymock et al. | 208/50 |
| 4,468,316 | 8/1984 | Swanson | 208/59 |
| 4,473,462 | 9/1984 | Swanson | 208/59 |

OTHER PUBLICATIONS

Chemical Abstract, vol. 92, No. 131888t, Czech. Pat. No. CS 177721, Mar. 15, 1979.
Chemical Abstract, vol. 89, No. 92185c, German Pat. No. DE 2742587, Mar. 30, 1978.
Derwent Abstract Accession No. 76-40077x/22, German Pat. No. DD-118440, Mar. 5, 1976.
Chemical Abstract, vol. 99, No. 75888y, German Pat. No. DD-200159, Mar. 23, 1983.
Chemical Abstract, vol. 99, No. 75887x, German Pat. No. DD-200158, Mar. 23, 1983.
Djerfi, et al., *RO Rafinerija, Nafte, Energoinvest*, (1982), 693-8.

Primary Examiner—Amelia Burgess Yarbrough
Attorney, Agent, or Firm—Ted C. Gillespie; Robert F. Rywalski; Paul N. Kokulis

[57] ABSTRACT

An asphalt-based composition comprising an air-blown blend of hard asphalt flux and the residue obtained by vacuum distilling the product obtained by the hydrogenation of asphalt flux, the composition meeting coating grade asphalt specifications.

9 Claims, No Drawings

COATING GRADE ASPHALT

FIELD OF THE INVENTION

The present invention is concerned with coating grade asphalt and its preparation.

BACKGROUND OF THE INVENTION

Hard asphalt fluxes are available in relatively large quantities and could provide a useful and inexpensive source of asphalt for use in making coating grade asphalt if means could be found for modifying the flux properties so that, after airblowing, the essential combination of softening point and penetration value is obtained without loss of other important properties.

In conventional practice, asphalt flux is air blown, in the presence or absence of a catalyst, in order to modify the properties of the flux as needed for a desired use. Certain types of asphalt flux can be air-blown in this fashion to give the right combination of softening point and penetration required for coating grade asphalt (also called "roofing grade asphalt" or just "roofing asphalt"). Desirably, for example, coating grade asphalt has a softening point of about 200–225° F. and a penetration value of 16–22 although the penetration can be a point or two lower where the softening point is on the high side of the indicated range or even higher, e.g. 230–235° F.

Some asphalt fluxes, however, cannot be airblown, with or without a catalyst, to give the softening point and penetration properties essential for use as coating grade or roofing asphalt. Typical of these fluxes are paving grade asphalt, California hard flux and the like. For example, paving grade asphalt flux known as AC-20, when air blown without a catalyst, gives a softening point of about 214° F. and penetration of 4.5. Air blowing with a catalyst increases the softening point to 230° F. but the penetration obtained, about 8, is still too low for coating grade asphalt. Nevertheless, because such fluxes are relatively inexpensive and available in good supply, the development of methods of modifying these hard fluxes to make them useful for coating grade asphalt is of considerable commercial interest. Various different methods have been proposed for modifying hard asphalt fluxes to meet this need and some of these proposals have been successful in varying degrees. However, there is still a need for a convenient and reliable way of modifying hard asphalt fluxes to obtain coating grade asphalt.

The principal object of the present invention is to provide an effective and convenient method for modifying hard asphalt fluxes so that they can be used as coating grade asphalt. Other objects, including the provision of additional property improvements in the asphalt product of the invention, will also be apparent.

DETAILED DESCRIPTION OF THE INVENTION

According to the invention, coating grade asphalt is prepared by catalytically air blowing a blend of "straight" (i.e. unmodified) hard flux and the residue obtained by vacuum distillation of a flux which has previously been hydrogenated.

The straight hard flux used for blending and the flux which is hydrogenated to provide the blending residue may be the same or different. Preferably, however, the straight flux and the flux which is hydrogenated are both of the type which normally cannot be air-blown by themselves into a product which has the combination of penetration value and softening point required to meet coating grade asphalt specifications. In some circumstances, it may be useful to employ a soft flux for hydrogenation but, generally speaking, a hard flux will be used to prepare this component of the present blends because hard fluxes are less expensive. In any case, that is whether a hard or soft flux is hydrogenated for blending according to the invention, it has been found that coating grade specifications can be met by appropriate blending of hard flux and hydrogenated residue prepared as described hereinafter.

As indicated the residue used herein may be prepared by hydrogenating any asphalt flux but preferably one which normally cannot be air-blown to meet coating grade asphalt requirements. Typically the flux is hard paving grade asphalt although other fluxes, e.g. California hard flux, may be used. The hydrogenation is conveniently accomplished in an autoclave using a metal halide hydrogenation catalyst, e.g. a transition metal halide such as ferric chloride, aluminum chloride, zinc chloride or the like, zinc chloride being preferred. The catalyst concentration and hydrogenation conditions can be varied. However, the catalyst concentration will usually fall in the range of 1 to 12%, based on the weight of flux being hydrogenated. Temperatures in the order of 550–750° F. can be used along with hydrogen pressures of 800 to 2400 psia. Preferably, the temperature used is in the range of 680–700° F. with a pressure of 1000 to 1500 psia. However, conditions outside these ranges may also be used, the essential point being to significantly hydrogenate the flux as measured by the amount of hydrogen consumed. Useful results can be obtained, for example, with 200–2000 cubic feet of hydrogen consumed per ton of flux although amounts of hydrogen outside this range can also be employed depending on other factors. The product obtained using higher amounts of hydrogen will generally have a lower softening point and may permit the use of smaller amounts of the hydrogenated product to obtain the desired result. However, higher hydrogenation is also accompanied by the formation of larger amounts of low flash point materials which need to be removed. Hence it is usually necessary to select the degree of hydrogenation so as to obtain a balance between softening point of the hydrogenated material and the formation of undesired low flash material.

While the reactions which occur in the hydrogenation are complex, it is evident that hydrogenation raises the hydrogen to carbon ratio in the flux and consequently increases its penetration number and makes it softer. The hydrogenation apparently causes direct hydrogen addition to the aromatic rings and double bonds present in the flux. Because the hydrogenated residue is used to blend with hard flux, it is essential that the residue have a relatively high flash point (above 550° F.) and a high boiling point in addition to a penetration high enough to make it an effective softener for hard flux.

After the hydrogenation reaction is completed to the extent desired, the catalyst should be removed, for example, by filtering and, if desired, regenerated for further use. The hydrogenated product separated from catalyst is then subjected to vacuum distillation to remove low flash material e.g. any material that flashes off below 500° F. at atmospheric pressure. The distillation conditions can be varied and will depend on other factors, for example, the nature of the materials to be removed. Normally temperatures and pressures in the ranges of 200° F. to 450° F. and 1 mm to 20 mm of mercury, respectively, can be effectively used, it being understood that lower temperatures within the stated range can be used as the pressure is reduced. Advantageously distillation is carried out in two stages, a first stage at around 550° F. and atmospheric pressure and a second stage under vacuum, for example 20 mm Hg, at 300–350° F. to remove the last traces of low flash material. If the vacuum distillation stage is carried out under higher vacuum conditions, e.g. 1 mm Hg, the temperature may be reduced to something as low as 200° F. In any case, at least the final stages of the distillation should be carried out under reduced pressure or vacuum to insure that all, or essentially all, low flash material, which normally comprises $C_{8-40}$ paraffins, is removed from the hydrogenated material.

The vacuum distilled hydrogenation residue thus obtained may then be blended with straight hard paving grade flux according to the invention. The amount of residue so used can be varied depending on the specific properties desired in the final blend. Usually, however, the blend will comprise, on a weight basis, 10–50% of the vacuum distilled hydrogenation residue and 90–50% of the straight hard flux. Preferably the blend comprises 15–35% of the hydrogenated residue, balance hard flux.

Blending conditions may be varied. However, blending usually is accomplished at 350–500° F., preferably at 400–450° F., over a period of time ranging from 30 minutes to 2 hours.

The blend should thereafter be air blown in the presence of catalyst. Conventional blowing catalysts and conditions may be used. Advantageously the catalyst is ferrous chloride used in a concentration of 0.25 to 2% by weight of the blend mixture being blown although, as indicated, other catalysts may be used in amounts both within and without the range stated. Typically suitable blowing temperatures are 450° F. to 500° F. using air flow rates in the range of 100–400 scf/min. ton.

As will be evident from the foregoing, the coating grade asphalt products of the invention are prepared by a method which comprises the following essential steps:

(1) flux, preferably hard flux, is reacted with hydrogen gas under moderate to high temperature and pressure (e.g. 700° F., 1000–2000 psia) using an appropriate catalyst such as zinc chloride;

(2) low flash materials resulting from cracking reactions accompanying the hydrogenation reaction are then stripped by such methods as vacuum distillation or the equivalent;

(3) the hydrogenated residue, which is considerably softer than the original flux, is blended with hard flux in concentrations preferably between 15 to 35% by weight; and (4) the blend is then catalytically blown to the required specifications.

The above described method may be conducted batchwise or in continuous fashion. If run continuously, it may be advantageous to use an ebullating catalyst bed with a purification step to remove asphalt vapors present in recycled hydrogen gas.

As noted earlier, any available hard flux, i.e. any flux which cannot be air blown to meet coating grade asphalt specifications, may be used as the straight flux for blending or as the flux from which the vacuum distilled hydrogenation residue is prepared. Thus, for example, any paving grade asphalt having an AC value of 10 or higher (such as AC-20) or California asphalt of AR-1000 or higher viscosity grading may be used. It will be understood, however, that for present purposes, the reference herein to hard flux is intended to embrace any asphalt material which cannot be processed to meet coating grade asphalt requirements when air blown by itself, either with or without the use of a catalyst.

It is a particular advantage of the invention that it can be effectively used despite significant variations in the hard fluxes which may be employed. There tend to be large variations in physical and other properties of fluxes depending on the source of the material. However, the degree of hydrogenation and the amount of hydrogenated residue blended with the hard flux can be varied to accommodate these variations.

The invention is illustrated, but not limited, by the following examples:

EXAMPLE 1

1000 grams of paving hard flux (AC-20) and 20 grams of $ZnCl_2$ were placed in an autoclave and heated to about 700° F. Autoclave air was evaluated during the heating-up stage.

After the autoclave contents had reached the reaction temperature of about 700° F., hydrogen was introduced into the autoclave at an initial hydrogen pressure of about 1800 psi. The hydrogenation was continued for 4 hours at which time it appeared that 750 ft$^3$ of hydrogen had been consumed per ton of asphalt.

The thus hydrogenated product was vacuum distilled to remove low flash material at a temperature of about 550° F. and a pressure of about 20 mm Hg. Seven percent of the hydrogenated product was stripped as low flash material while 93% was an oily residue with a flash point of 575° F.

100 grams of the vacuum distilled hydrogenated residue was blended with 300 grams of paving grade hard flux (AC-20) by mixing at 450° F. for 2 hours. Thereafter 4 grams of hydrous ferrous chloride (33% water) was added to the blend and the resulting mixture was air blown at 470° F. using an air flow rate of 4.8 scfh. The following results were obtained.

| Blowing Time | Softening Point (°F.) | Penetration |
| --- | --- | --- |
| 1¼ hr | 125 | |
| 2¼ hr | 140 | |
| 4¼ hr | 180 | |
| 7 hr | 223 | 17,17,17 |

The softening point of the starting flux (AC-20) was about 122° F. The substantially increased softening point (223° F.) and the penetration value (17) obtained after about 7 hours of air blowing the blend are adequate to meet coating grade asphalt specifications.

EXAMPLE 2

1000 grams of paving grade hard flux (AC-20) and 100 grams of $ZnCl_2$ were placed in an autoclave and heated at about 725° F. with an initial hydrogen pressure of about 2400 psi. The hydrogenation was continued for 4 hours at which time it appeared that about 2060 ft$^3$ of hydrogen was consumed per ton of asphalt. The hydrogenated product was vacuum distilled as in Example 1. 20 percent of the hydrogenated product was stripped as low flash material while 80 percent was an oily residue with a flash point of 575° F.

60 grams of the hydrogenated residue was blended with 140 grams paving grade hard flux (AC-20) in a manner similar to Example 1 and blown with 2% hydrous $FeCl_2$ (33% water), using an air flow rate of 2.5 scfh and a temperature of 470° F. to give the following results.

| Time | Softening Point (°F.) | Penetration |
|---|---|---|
| 1 hr | 126 | |
| 2 hr, 35 min | 180 | |
| 3 hr, 37 min | 236 | |
| 3 hr, 47 min | 259 | 17½,18,18,18 |

The product thus obtained demonstrates a softening point and penetration value suitable for coating grade asphalt.

Property evaluation of blends according to the invention indicates significant improvement in several other important product properties over and above the combination of softening point and penetration required to convert hard fluxes to coating grade asphalts. These additional property improvements include:

Thermal Stability

Thermal stability of the hydrogenated blends is better than that of standard coating grade asphalt. In most cases a dropback of less than 10° F. is observed on ageing the blend at 500° F. for 12 hours.

Sliding Resistance

The blends of the invention show up to 50 percent improvement in sliding resistance over standard built-up roofing asphalts.

Filler Uptake

The blends also show a significantly higher softening point than standard coating grade asphalt upon the addition of equivalent filler amounts. This feature allows the use of as much as 70 percent or more filler with blends according to the invention to give final products with a viscosity in a processable range and a sliding property comparable to that of 65 percent filled standard low melt coating. For this purpose, it is necessary to use a blend that has a softening point before filler addition of around 180° F.

The more pronounced increase in softening point with filler addition is believed to be due to cracking reactions accompanying the main hydrogenation reactions. Cracking of aromatic rings creates double bonded functionalities which are oxidized to acids, anhydrides, or peroxides on blowing. It is bellowed that, due to the normally basic nature of the filler, a stronger filler-asphalt bond occurs in the hydrogenated product than in the standard, thus leading to a higher softening point in the filler-modified product of the invention.

Further hydrogenation examples illustrative of the invention asre tabulated below:

TABLE I

| | | | Reaction Conditions | | |
|---|---|---|---|---|---|
| Run # | T (°F.) | Pressure (psia) | Catalyst (Percent) | DELTA PRESSURE (psia/g) | $H_2$ Consumed (ft³/ton) |
| 1 | 725 | 2400 | Zinc Chloride (10) | 1.57 | 2060 |

TABLE I-continued

| | | | Reaction Conditions | | |
|---|---|---|---|---|---|
| Run # | T (°F.) | Pressure (psia) | Catalyst (Percent) | DELTA PRESSURE (psia/g) | $H_2$ Consumed (ft³/ton) |
| 2 | 695 | 1500 | Zinc Chloride (10) | 0.30 | 234 |
| 3 | 680 | 1000 | Zinc Chloride (2) | 0.15 | 199 |
| 4 | 700 | 1500 | None | 0.60 | 448 |
| 5 | 700 | 1500 | Zinc Chloride (2) | 0.60 | 448 |
| 6 | 700 | 1800 | Zinc Chloride (2) | 1.00 | 747 |

Symbols
DELTA PRESSURE = pressure drop expressed in pounds per square inch per gram of asphalt.

The residues obtained in Runs 1-6 of Table I had the following properties after removal of low flash materials:

TABLE II

| | Hydrogenated Residue Properties | | | |
|---|---|---|---|---|
| Run # | Flash Point (°F.) | Softening Point (°F.) | Penetration | Low Flash Material Recovered wt (%) |
| 1 | 575 | too soft | too soft | 20 |
| 2 | 616 | too soft | too soft | 15 |
| 3 | 570 | 120 | 88 | 3 |
| 4 | 555 | 100 | 200 | 8 |
| 5 | 590 | 90 | greater than 300 | 10 |
| 6 | 515 | 105 | greater than 300 | 8 |

Blends of the above hydrogenated residues (Run #1–6) with hard fluxes were prepared as shown in Table III to give products after blowing having the indicated softening points an penetration values:

TABLE III

| | Blending and Blowing Results | | | | |
|---|---|---|---|---|---|
| Blend | Blendstock 1 (%) | Blendstock 2 (%) | $FeCl_2$ (%) | Softening Point (°F.) | Penetration |
| HDB-1 | AC-20(80) | HDR-1(20) | 0.57 | 258 | 18 |
| HDB-3 | AC-20(75) | HDR-2(25) | 0.67 | 229 | 14 |
| HDB-5 | AC-20(75) | HDR-3(25) | 0.67 | 262 | 11 |
| HDB-7 | AC-20(85) | HDR-5(15) | 0.50 | 212 | 14 |
| HDB-8 | AC-20(75) | HDR-5(25) | 0.50 | 215 | 16 |
| HDB-9 | AC-20(75) | HDR-5(25) | 0.50 | 218 | 13 |
| HDB-10 | AC-30(75) | HDR-4(25) | 0.50 | 211 | 13 |
| HDB-11 | AC-30(75) | HDR-6(25) | 0.50 | 223 | 17 |

Symbols
HDB = hydrogenated blend
HDR = hydrogenated residue followed by a number reference which corresponds with the appropriate run number given in Tables I and II.

Some of the hydrogenated blends (HBR) set out in Table IV were evaluated for thermal stability with the folllowing results:

TABLE IV

| | Thermal Stability Evaluation on Hydrogenated Blends | | |
|---|---|---|---|
| Sample | Ageing Temperature (°F.) | Ageing Time (hr) | Softening Point (°F.) |
| HDB-7 | 450 | 0 | 212 |
| | 450 | 67 | 207 |
| HDB-8 | 450 | 0 | 215 |
| | 450 | 67 | 210 |
| HDB-9 | 500 | 0 | 218 |
| | 500 | 4 | 215 |

TABLE IV-continued

Thermal Stability Evaluation on Hydrogenated Blends

| Sample | Ageing Temperature (°F.) | Ageing Time (hr) | Softening Point (°F.) |
|---|---|---|---|
| | 500 | 20 | 209 |

The sliding properties of hydrogenated blends (unfilled) were also evaluated and compared with a standard coating grade asphalt. The following results were obtained:

TABLE V

Sliding Property Evaluation on Unfilled Hydrogenated Blends at 180° F. for Two Hours

| Sample | Run # | Softening Point (°F.) | Sliding (Inches) |
|---|---|---|---|
| Standard | 1 | 212 | 16/32 |
| | 2 | 212 | 22/32 |
| HDB-7 | 1 | 212 | 9/32 |
| | 2 | 212 | 6/32 |
| HDB-8 | 1 | 215 | 7/32 |
| | 2 | 215 | 6/32 |

Viscosity evaluations were also on various filled blends with the following results:

TABLE VI

Viscosity Evaluation on Filled Hydrogenated Blends

| Sample | Initial Softening Point (°F.) | Filled Percent Filler | Softening Point (°F.) | Temperature (°F.) | Viscosity (cps) |
|---|---|---|---|---|---|
| Standard | 219 | 65 | 254 | 375 | 11,250 |
| | | | | 400 | 4,813 |
| | | | | 425 | 2,850 |
| HDB-11 | 223 | 65 | 282 | 375 | 33,000 |
| | | | | 400 | 10,000 |
| | | | | 425 | 4,375 |
| | 166 | 70 | 214 | 375 | 4,913 |
| | | | | 400 | 2,900 |
| | | | | 425 | 2,325 |
| | 173 | 70 | 229 | 375 | 7,500 |
| | | | | 700 | 3,875 |
| | | | | 424 | 2,400 |
| | 183.5 | 70 | 242 | 375 | 10,750 |
| | | | | 400 | 5,500 |
| | | | | 425 | 3,375 |
| | 196.5 | 70 | 262 | 375 | 29,500 |
| | | | | 400 | 13,000 |
| | | | | 425 | 6,900 |

Symbols
HDB = hydrogenated blend
Filler = calcium carbonate

Thus the hydrogenated blends enable the use of 70% filler while maintaining viscosities within processing range.

Sliding property was evaluated on filled hydrogenated blends with the following results:

TABLE VII

Sliding Property Evaluation on Filled Hydrogenated Blends at 180° F. for 24 Hours

| Run | Sample | Percent Filler | Softening Point (°F.) | Slide (Inches) | Viscosity at 4000° F. (cps) |
|---|---|---|---|---|---|
| 1 | Standard | 65 | 237 | 7/32 | 4,200 |
| 2 | | | | 7/32 | |
| 1 | HDB-11 | 70 | 229 | 12/32 | 3,875 |
| 2 | | | | 13/32 | |
| 1 | HDB-11 | 70 | 242 | 7/32 | 5,500 |
| 2 | | | | 7/32 | |

Symbols
HDB = hydrogenated blend.
Filler = calcium carbonate

It will be appreciated from the foregoing that the invention offers a way of converting hard asphalt fluxes into coating grade asphalt having the desired combination of softening point and penetration as well as other improved properties, e.g. better thermal stability, slide resistance and filler uptake. In the case of the filled blends, it will be recognized that any of the inorganic or organic fillers conventionally employed may be used herein. This uncludes, for example, clay, silica, calcium carbonate and the like.

Various modifications may be made in the invention as described above. Accordingly, the scope of the invention is defined in the following claims wherein.

I claim:

1. An asphalt-based composition suitable for use as coating grade asphalt comprising an air-blown blend of (a) 90–50% by weight of hard asphalt flux and (b) 10-50% by weight of a vacuum distilled residue by vacuum distilling the product obtained by the hydrogenation of hard asphalt flux, said residue having a flash point above 500° F., the hard asphalt flux (a) and (b) being such that cannot normally be air-blown to meet coating grade specifications for softening point and penetration whereas said composition is capable of meeting coating grade asphalt specifications for softening point and penetration and has a softening point in the range of 200–235° F. and a penetration of 14–22.

2. A composition according to claim 1, wherein the blend comprises 15–35% of said residue and the balance is hard flux.

3. A composition according to claim 1 including up to 70% by weight of filler.

4. A composition according to claim 1 wherein the residue has a flash point above 550° F.

5. A process for preparing the composition of claim 1 which comprises hydrogenating a hard asphalt flux; vacuum distilling the hydrogenated product to remove low flash material and leave a hydrogenated residue having a flash point above about 500° F.; blending said residue with hard asphalt flux and then catalytically air-blowing the blend to obtain a blown blend having a softening point and penetration value meeting coating grade asphalt specifications.

6. The process of claim 5 wherein the hydrogenation is carried out at a temperature of 550° F.–750° F. using a hydrogen pressure of 800 to 2400 psia; the hydrogenation being continued until 200–2000 cubic feet of hydrogen are consumed per ton of starting flux.

7. The process of claim 6 wherein the distillation is carried out in two stages, the first being carried out at atmospheric pressure and the second under vacuum until all low flash material is removed.

8. The process of claim 7 wherein the blending is carried out at 350°–500° F. over a period ranging from 30 minutes to 2 hours.

9. The process of claim 8 wherein the air blowing is carried out at a temperature of 450° to 500° F.

* * * * *